United States Patent [19]

Ito

[11] Patent Number: 4,562,817

[45] Date of Patent: Jan. 7, 1986

[54] FUEL INJECTION TIMING CONTROL SYSTEM FOR INTERNAL COMBUSTION ENGINE AND CONTROL METHOD THEREFOR

[75] Inventor: Teruyuki Ito, Tokyo, Japan

[73] Assignee: Nissan Motor Company, Limited, Yokohama, Japan

[21] Appl. No.: 445,552

[22] Filed: Nov. 30, 1982

[30] Foreign Application Priority Data

Dec. 22, 1981 [JP] Japan ............... 56-206064

[51] Int. Cl.[4] .................... F02D 5/02
[52] U.S. Cl. .................. 123/478; 123/432; 123/491; 123/492
[58] Field of Search ........... 123/478, 472, 432, 445, 123/492, 476, 491

[56] References Cited

U.S. PATENT DOCUMENTS

| | | |
|---|---|---|
| 1,999,116 | 4/1935 | Sidney . |
| 3,125,085 | 3/1964 | Kauffmann . |
| 3,460,520 | 8/1969 | Huber .................... 123/478 |
| 3,626,910 | 12/1971 | Porsche et al. . |
| 3,682,152 | 8/1972 | Müller-Berner ........ 123/478 |
| 3,719,177 | 3/1973 | Oishi et al. ............ 123/476 |
| 4,100,891 | 7/1978 | Williams .............. 123/179 G |
| 4,213,425 | 7/1980 | Read .................... 123/478 |
| 4,317,438 | 3/1982 | Yagi et al. ............. 123/432 |
| 4,359,032 | 11/1982 | Ohie .................... 123/478 |
| 4,418,674 | 12/1983 | Hasegawa et al. ......... 123/491 |

FOREIGN PATENT DOCUMENTS

| | | | |
|---|---|---|---|
| 2815701 | 10/1979 | Fed. Rep. of Germany | 123/432 |
| 2273952 | 1/1976 | France . | |
| 2455681 | 11/1980 | France . | |
| 55-164761 | 12/1980 | Japan ................. | 123/445 |

OTHER PUBLICATIONS

K. Newton, "The Motor Vehicle", 3d ed., 1946.

*Primary Examiner*—Andrew M. Dolinar
*Attorney, Agent, or Firm*—Schwartz, Jeffery, Schwaab, Mack, Blumenthal & Evans

[57] ABSTRACT

A fuel injection control system for an internal combustion engine having a fuel injection valve located near an intake port can control the timing of fuel injection in synchronism with engine revolution. The fuel injection control system improves fuel atomization characteristics and uniformity of air/fuel mixture entering the engine cylinders. The control system controls the fuel injection timing so that the fuel injection occurs within a valve-overlap period during which an intake valve and an exhaust valve are both open. In order to precisely control the fuel injection timing, the piston stroke of each engine cylinder is detected with reference to the crank shaft angular position.

17 Claims, 11 Drawing Figures

FUEL INJECTION TIMING CONTROL SYSTEM FOR INTERNAL COMBUSTION ENGINE AND CONTROL METHOD THEREFOR

BACKGROUND OF THE INVENTION

The present invention relates generally to a fuel injection control system for controlling air-fuel mixture supply for a fuel injection internal combustion engine. More particularly, the invention relates to a fuel injection timing control for controlling the timing of injection of fuel into the engine, especially for the type of engine in which the fuel injection valve is disposed near an intake port and ejects atomized fuel towards an intake valve.

Generally, fuel injection takes place in synchronism with engine revolution. The timing of fuel injection is thus controlled in relation to the engine revolution with reference to the angular position of a crank shaft. A representative prior-art method of fuel injection is to direct the fuel injection valve towards the intake valve of each engine cylinder in order to inject the fuel towards the valve head of the intake valve. The fuel injected towards the valve head of the intake valve is atomized by colliding with the valve head and the ambient heat in the intake manifold. However, some of the fuel condenses on the valve head and is introduced into the engine combustion chamber in a liquid state. This causes cooling of the spark ignition plug and also results in inaccuracies and irregularities in the air/fuel ratio of the mixture. As a result, engine roughness is increased and/or engine starting characteristics are degraded.

The present invention is to resolve the abovementioned defects in the conventional fuel injection system for better engine performance.

SUMMARY OF THE INVENTION

Therefore, it is an object of the present invention to provide a fuel injection timing control system and a control method therefor, in which fuel injection timing is controlled in a predetermined relationship to engine revolution in order to achieve satisfactory atomization of the fuel and a constant air/fuel ratio of the mixture.

A more specific object of the present invention is to provide a fuel injection timing control system by which fuel injection takes place at such a time that the injected fuel will be subjected to a significantly high temperature surge of gas in the combustion chamber in order to improve atomization and will be then drawn into the combustion chamber by the vacuum subsequently created therein.

According to the present invention, a fuel injection takes place at the moment of valve overlap, at least under predetermined engine operational conditions. In order to perform fuel injection at the moment of valve overlap, an engine revolution sensor is designed to produce a fuel injection signal at a predetermined engine revolution angular position.

In the preferred embodiment a fuel injection control system for a fuel injection internal combustion engine comprises first means for detecting an engine operating condition and producing a first signal representative of a parameter used in determining the fuel injection amount, second means for detecting the engine crank shaft angular position and producing a second signal each time the crank shaft reaches a predetermined angular position, third means for operating the intake and exhaust valves of the engine in synchronism with the crank shaft rotation so as to provide a predetermined valve overlap period during which both the intake and exhaust valves are open, fourth means for determining the fuel injection amount on the basis of the first signal and producing a control signal for controlling a fuel injection valve, the fourth means being responsive to the second signal for delivering the control signal to the fuel injection valve during the valve overlapping period.

BRIEF DESCRIPTION OF THE DRAWINGS

The present invention will be understood more fully from the detailed description given herebelow and from the accompanying drawings of the preferred embodiment, which, however, should not be taken as limitative to the invention but for elucidation and explanation only.

In the drawings.

DESCRIPTION OF THE PREFERRED EMBODIMENT

Figure 1:
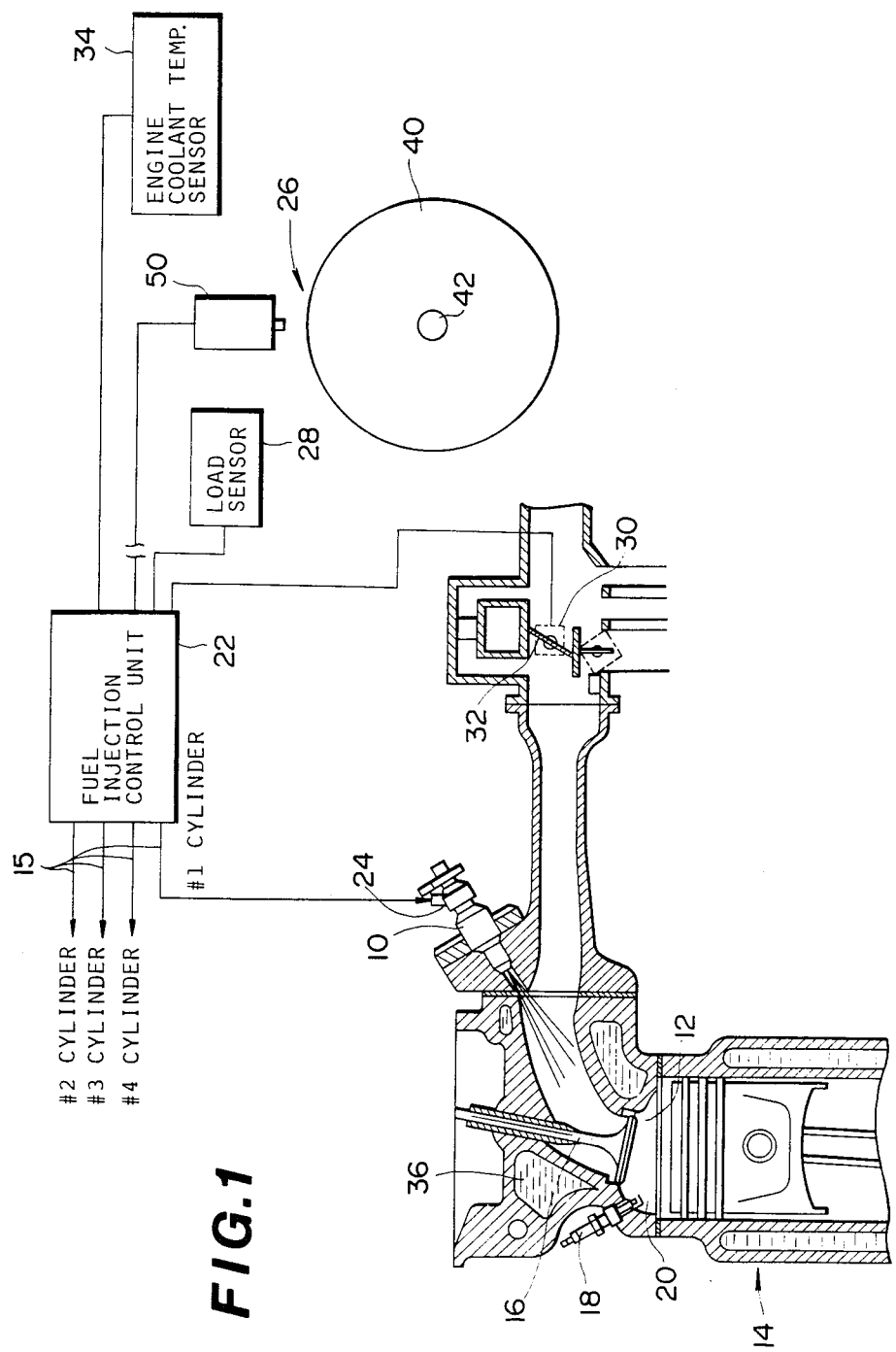
FIG. 1 is a fragmentary illustration of the first embodiment of a fuel injection control system according to the present invention.

Referring now to the drawings, in FIG. 1 there is illustrated a fuel injection system in which each fuel injection valve 10 is located near an intake port 12 of the corresponding engine cylinder 14. As is well known, the intake port 12 is opened and closed by an intake valve 16. A spark ignition plug 18 is also provided in the engine cylinder 14 for performing spark ignition in a combustion chamber 20 at a controlled timing. For the sake of clarity, only one combustion chamber 20 and associated equipment are shown in FIG. 1.

A fuel injection control unit 22 is connected to an electromagnetic actuator 24 of the fuel injection valve 10 for controlling the fuel injection amount as well as the fuel injection timing in accordance with an engine operating condition. The fuel injection control unit 22 is connected to a crank angle sensor 26 to receive therefrom a crank reference signal and a crank position signal. As is well known, the crank reference signal is produced each time the crank shaft rotates through a predetermined angle, i.e., every 90° for four-cylinder engine or 60° for six-cylinder engine. On the other hand, the crank position signal is produced for every predetermined angular increment of the crank shaft rotation, i.e., 1° or 2°. The fuel injection control unit 22 is also connected to a load sensor 28, such as an air flow sensor or an intake vacuum sensor, and to an engine idling detector 30 which is responsive to the fully-closed position of a throttle valve 32.

Preferably, the fuel injection control unit 22 is connected to an engine coolant temperature sensor 34 inserted into a water jacket 36 of the engine cylinder.

The fuel injection control unit 22 calculates the fuel injection amount on the basis of the load on the engine which is represented by the load sensor signal value and the engine speed as derived from the crank angle sensor signals. The fuel injection amount calculated on the basis of the engine load parameter and the engine speed parameter may be corrected on the basis of the engine coolant temperature parameter and other engine operational parameters. Such fuel injection amount calculation is per se well known to those skilled in the art. For example, U.S. Pat. Nos. 4,199,812 to Klotzner et al and 4,319,327 to Higashiyama et al respectively disclose this method of fuel injection calculation.

In U.S. Pat. No. 4,199,812, there is disclosed a fuel injection system which receives a valve control pulse, the length of which determines the fuel amount delivered to the engine. A first counter receives a pulse train whose frequency depends on the air flow rate and this pulse train is admitted for a period defined by the engine speed. The content of the counter is then counted out at a frequency which is synthesized from operational parameters of the engine, including, in particular, the temperature. For this purpose, there is generated a temperature dependent frequency which is fed to a multiplier circuit which combines this frequency with data derived from a memory to generate an output signal which is further processed to provide the fuel injection pulse for the engine.

Alternatively, U.S. Pat. No. 4,319,327 discloses a load dependent fuel injection control system, in which a fuel injection rate control system for a fuel injection internal combustion engine produces a basic fuel injection rate signals upon detection of the load on the engine and the engine speed. The fuel injection rate signal is modified by the correction values read out from a collection of data indicating various correction values in terms of the engine speed and the engine load. When the correction values selected are zero or smaller than a predetermined value, the fuel injection rate may be controlled to achieve a predetermined air/fuel ratio in the engine through detection of the air/fuel ratio of the mixture produced in the engine.

The disclosure in the foregoing U.S. Patents are herewith incorporated by reference.

Figure 2:
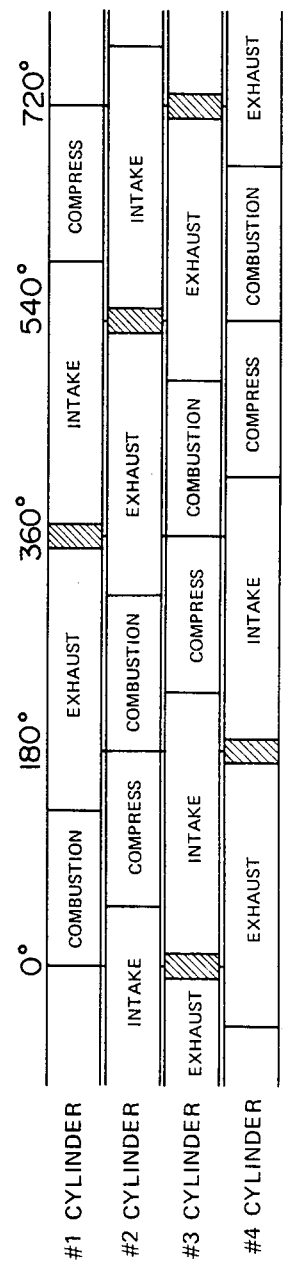
FIG. 2 is an explanatory timing chart of engine cycle of respective engine cylinders in a four-cylinder four-cycle engine.
Figure 5:
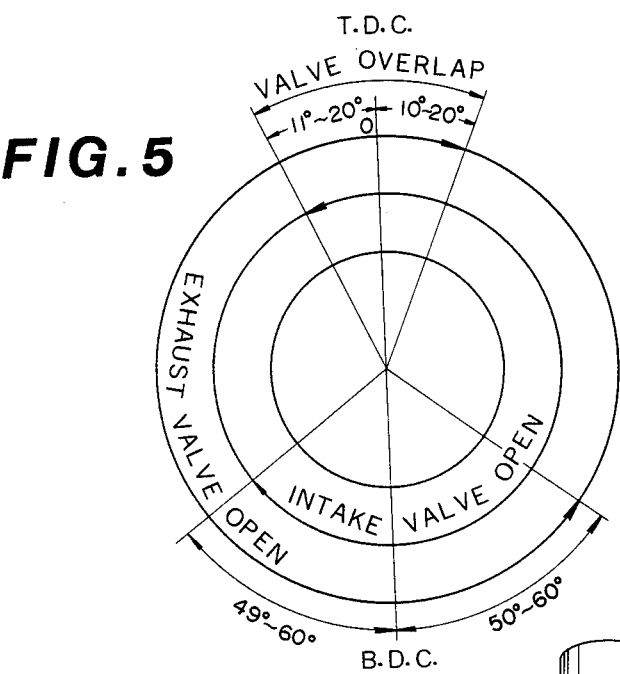
FIG. 5 shows open timings of the intake and exhaust valve in relation to crank shaft angular position.

Furthermore, the fuel injection control unit 22 also controls the fuel injection timing by controlling transmission of the fuel injection signal. In order to achieve better atomizing characteristics and to achieve a more-nearly constant mixture ratio of the air/fuel mixture, the fuel injection is controlled to occur during the valve overlap period wherein both the intake valve 16 and an exhaust valve (not shown) are open. FIG. 2 shows a general engine cycle of a four-cylinder four-cycle engine in an idling condition. In this chart, the intake stroke is considered as a period wherein the intake valve is open, the compression stroke is considered as a period wherein the intake and exhaust valve are both closed, the combustion stroke is considered as a period wherein combustion is performed with closing of both the intake valve and the exhaust valve, and the exhaust stroke is a period during which the exhaust valve is opened. Further in this chart, each hatched area shows the valve-overlapping period wherein both the intake and exhaust valves are open. As apparent from FIGS. 2 and 5, the intake valve opens in the crank shaft angular position about 11° to 20° before exhaust stroke top dead center and closes at the crank angle position about 49° to 60° after the intake stroke bottom dead center. On the other hand, a exhaust valve opens at the crank angle position about 50° to 60° before the combustion stroke bottom dead center and closes at a crank angle position 10° to 20° after the exhaust stroke top dead center.

Figure 4:
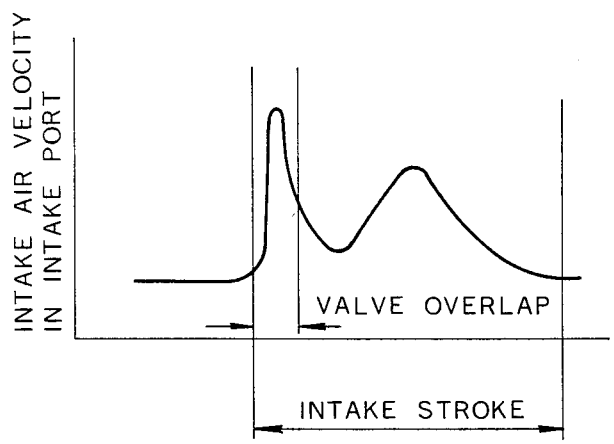
FIG. 4 is an illustrtion showing variation of a velocity of induction air flowing into the engine cylinder.

According to the present invention, the fuel injection control unit 22 controls the fuel injection timing in relation to the engine stroke with respect to the valve timing. Here, FIG. 4 shows variation of the intake air velocity flowing into the combustion chamber. As apparent from FIG. 4, the flow velocity of the intake air reaches a maximum during the valve overlapping period. The flow velocity of the intake air influences the atomization characteristics of the injected fuel and the atomization becomes effective as the intake flow velocity increases. Therefore, it should be understood that, for obtaining good fuel atomization characteristics, the fuel injection timing will be controlled adjacent to or in the valve overlapping period.

Figure 3:
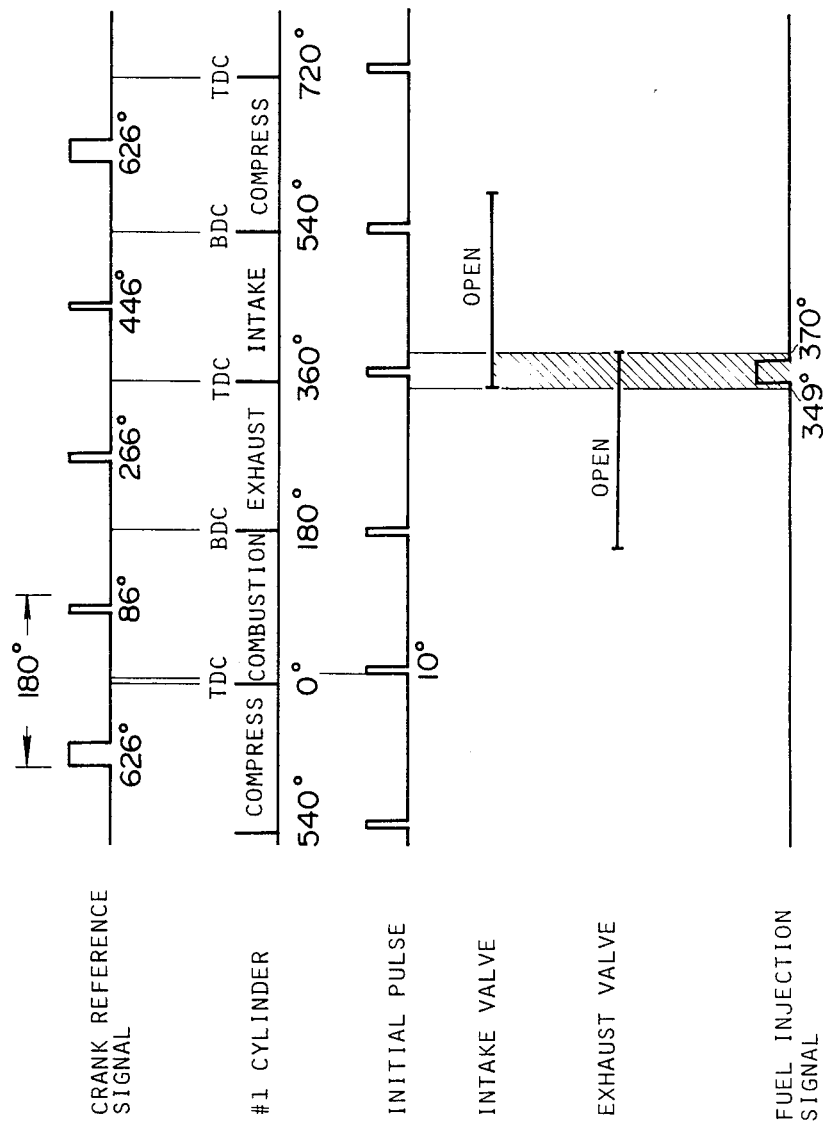
FIG. 3 is a timing chart of fuel injection timing in the No. 1 cylinder, which timing is controlled by the fuel injection control system of FIG. 1.

FIG. 3 shows an example of the fuel injection timing control for No. 1 cylinder according to the present invention. As will be appreciated herefrom, an initial pulse representative of a crank angle of approximately 10° after top dead center and bottom dead center of the piston stroke is produced with a delay of 104° with respect to the rising edge of the preceding crank reference angle signal which is produced 94° in advance of top or bottom dead center.

Assuming the No. 1 cylinder of a four-cylinder engine reaches top dead center position at a crank shaft angular position of 0° in the piston compression stroke, the exhaust valve will be open during a range of crank shaft angular position of approximately 130°–370°. On the other hand, the intake valve 16 will be open in the range of approximately 349° to 589° of crank shaft angular position. As a result, the open periods of the intake and exhaust valves overlap over a range of approximately 349° to 370°, as indicated by the hatched area in FIG. 3. The fuel injection control unit 22 transmits the fuel injection signal for the fuel injection valve 10 during the valve-overlap crank shaft angular position range.

It should be appreciated that the transmission timing of the fuel injection signal will vary in according with the setting of the valve-actuating cam shaft and the setting of the valve-overlap range. In addition, it should be appreciated that fuel injection timing for the remaining cylinders is controlled similarly to that of the foregoing.

In order to accurately control the fuel injection timing, it is essential to determine which cylinder should next receive the fuel injection signal in relation to the crank shaft angular position. In order to determine this, the crank angle sensor 26 in the preferred embodiment is adapted to produce differing crank reference angle signal pulse widths for the compression top dead center of No. 1 cylinder and for that of the other cylinders. As will be appreciated from FIG. 2, the crank reference angle signal representative of compression top dead center of the No. 1 cylinder has a longer pulse width, i.e., about 22°, than that of the remaining cylinders, i.e. about 7°.

Figure 6:
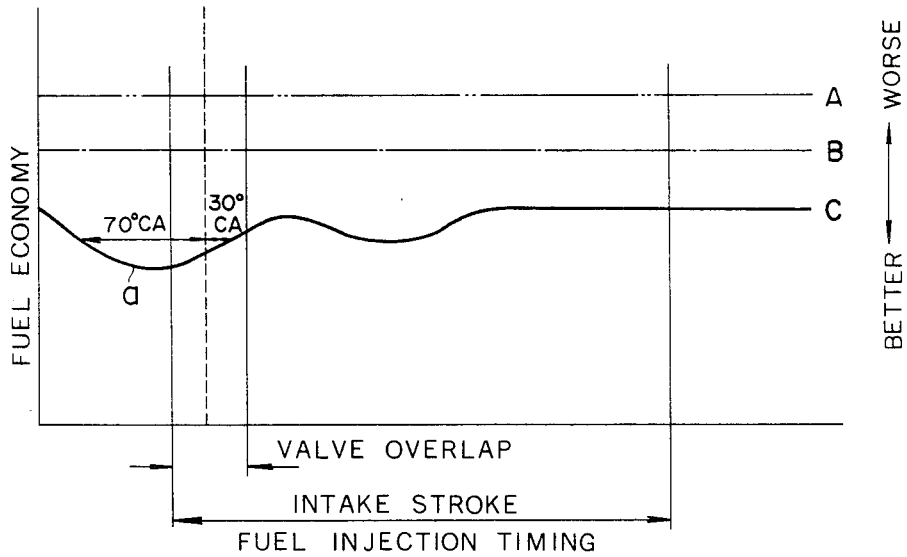
FIG. 6 is an illustration showing relationship of the fuel injection timing and fuel economy.

From the view point of fuel economy, the relationship of the fuel injection timing during engine idling is illustrated in FIG. 6. As is apparent from FIG. 6, the fuel economy is best at a fuel injection timing slightly before the exhaust stroke top dead center. The straight line A shows the fuel economy level in the conventional fuel injection and line b shows that of the conventional fuel injection with pre-heating of the intake air. The line C is experimentanily obtained by the fuel injection timing control according to the present invention. From FIG. 6, it becomes apparent that good fuel economy can be obtained by setting the fuel injection timing adjacent the exhaust stroke top dead center of each cylinder.

The normal fuel injection timing may be different from the valve overlapping period when the engine is warming-up for preventing the air/fuel mixture from becoming too lean as a result of surge gas. During engine warm-up, the fuel injection timing may be set at the compression stroke. According to the shown embodiment, the control unit varies the fuel injection timing based on a signal from the engine coolant temperature signal.

Figure 7:
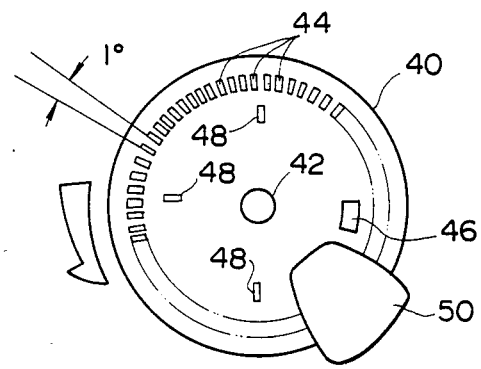
FIG. 7 is a front elevation of a crank angle sensor.

FIG. 7 shows the details of the crank angle sensor 26 applicable for the preferred embodiment of the fuel injection control system. A rotor 40 is fixed to the crank shaft 42 for rotation therewith. Slits 44 for the crank position signal are arranged radially symmetrically around rotor 40. The spacing between each slit 44 corresponds to 1° of crank shaft rotation. In addition, slits 46 and 48 are arranged at positions corresponding to predetermined crank shaft angular positions advanced from top dead center of each of the cylinders by a given angle. The slit 46 represents compression top dead center of the No. 1 cylinder and has a greater arc length than the slits 48 which represent the compression top dead center positions of the remaining cylinders. A photoelectric sensor element 50 faces one surface of the rotor 40 to produce a crank position signal pulse and/or a crank reference angle signal pulse each time one of the slits 44, 46 and 48 passes by sensor 50.

In the case of a four-cylinder engine, combustion takes place in the engine cylinders in the sequence #1-#4-#3-#2. Therefore, by identifying the compression top dead center of the No. 1 cylinder by distinguishing the pulse widths of the crank reference signal, the fuel injection control unit 22 can determine the cylinder to which to transmit the fuel injection signal. In practice, the fuel injection control unit 22 receives both the crank reference signal and the crank position signal in order to determine the cylinder to which to transmit the fuel injection signal and the transmission timing. In the above-mentioned case, since the crank reference signal representative of the compression top dead center of the No. 1 cylinder has a longer pulse width than the others, the fuel injection control unit 22 can distinguish the No. 1 cylinder top dead center directly and can track the other cylinders in the foregoing order by means of a simple counter shift register, or other switching arrangement.

Figure 8:
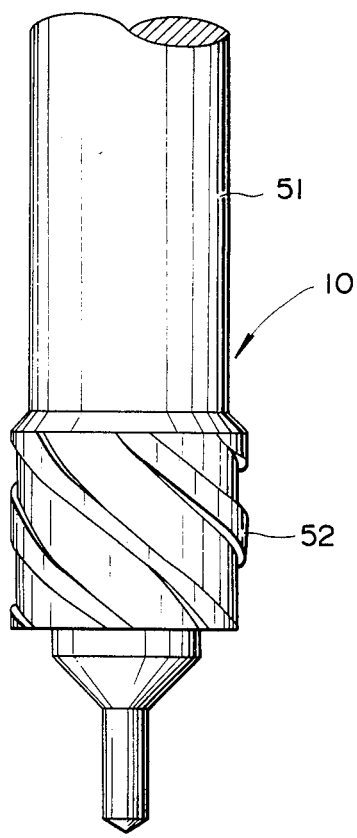
FIG. 8 is an enlarged front elevation of a needle of a fuel injection valve for use with the fuel injection system of FIG. 1.

In the preferred construction, the fuel injection valve 10 may be provided a fuel guide groove 52 near the top of a valve needle 51 in order to achieve better atomization characteristics, as shown in FIG. 8. With such a fuel injection valve, the fuel injected towards the intake valve will will tend to swirl. As a result, the fuel will be satisfactorily atomized and mixed with the intake air to eliminate non-uniformities in the air/fuel mixture.

As an alternative to the foregoing preferred embodiment, the fuel injection timing can be advanced to inject the fuel during the combustion stroke or after suction bottom dead center whenever engine revolution speed is higher than a given threshold. In this case, fuel injection should still be performed during the valve-overlap period whenever the engine is idling or the engine speed is below the given threshold. The fuel injection control unit 22 is responsive to the engine speed derived from the crank reference signal and the crank position signal or the engine idling signal from the idling detector 30 to set the fuel injection timing to the valve overlap-range. Alternatively, the engine load signal from the engine load sensor 28 may be used by the fuel injection control unit as representative of the engine operating conditions during which fuel injection should occur during the valve-overlap range. If necessary, the fuel injection control unit 22 can be responsive to the released position of a clutch or the neutral position of the transmission to set the fuel injection timing to the valve-overlap range.

In this modification, the fuel can be effectively atomized by the relatively hot surge of gas flowing back into the air intake passage through the intake valve and can then be introduced into the combustion chamber under low engine load conditions. On the other hand, by advancing the fuel injection timing under high engine load conditions, the exhaust gas component of the air/fuel mixture will be held to a minimum in order to provide better engine output characteristics and improve response characteristics to engine acceleration.

Figure 9:
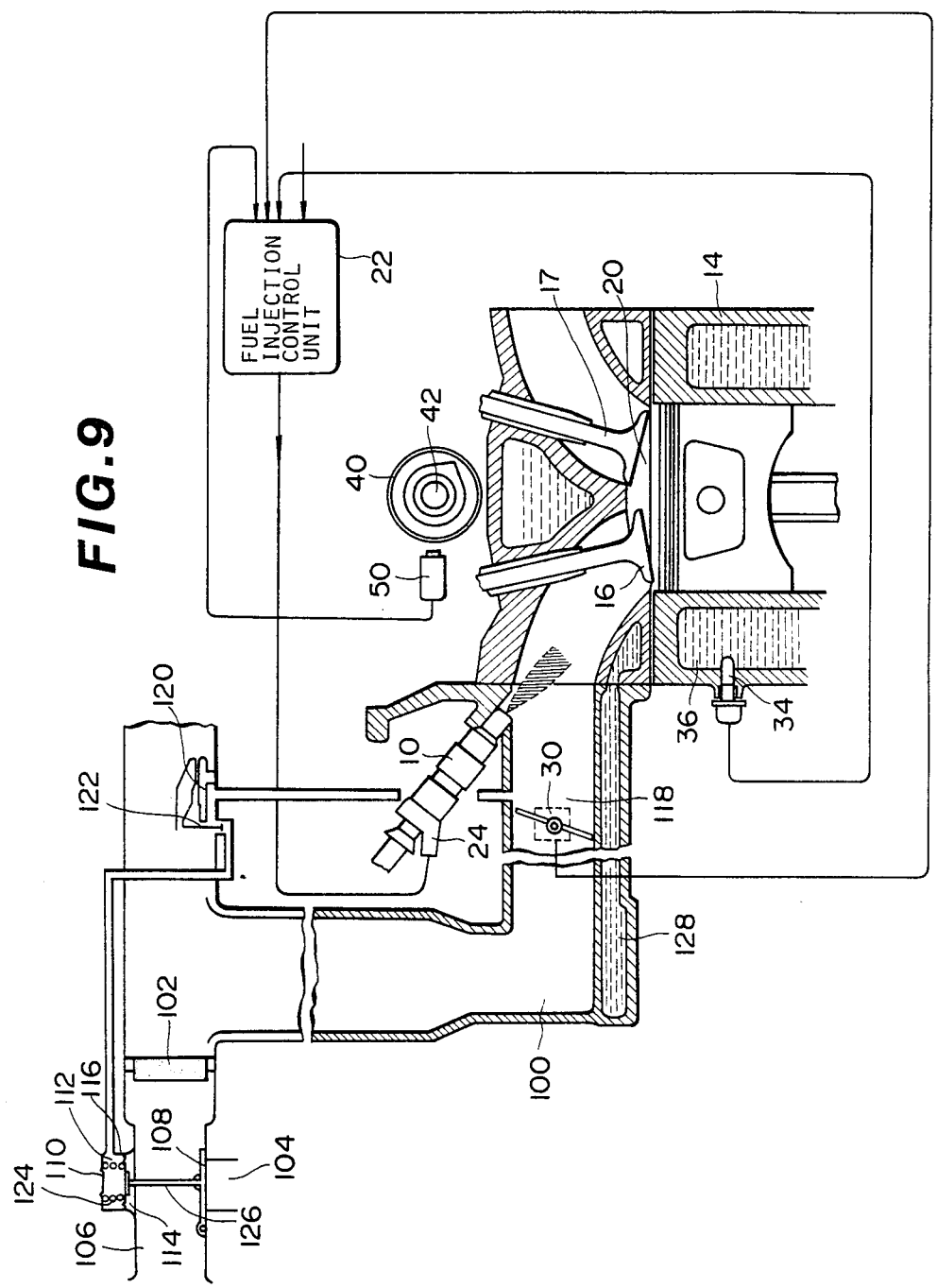
FIG. 9 is a fragmentary illustration of the second embodiment of the fuel injection control system according to the present invention.

Referring to FIG. 9, there is illustrated the second embodiment of the fuel injection control system according to the present invention. In this embodiment, the air induction system is modified from the foregoing first embodiment. Other features of the control system are constructed in a manner similar to the first embodiment. The features and construction elements having the same construction and similar functions are identified by the same reference numerals as referred in the first embodiment.

In the embodiment of FIG. 9, the air induction system 100 has an air cleaner 102. A warmed air induction passage 104 is connected to an intake duct 106 upstream of the air cleaner 102. A swing shutter 108 is provided in the outlet of the warmed air induction passage and is associated with a diaphragm actuator 110. The diaphragm actuator has a chamber 112 pertitioned from the other chamber 114 with an elastically deformable diaphragm 116. The chamber 112 is connected to the intake manifold 118 of the air induction system via an intake air temperature sensor 120. The intake air temperature sensor 120 incorporates with a thermosensitive valve 122 for establishing or blocking communication between the chamber 112 and the intake manifold.

If the intake air temperature is lower than a predetermined temperature, the thermosensitive valve 122 of the intake air temperature sensor 120 is actuated to open for introduce the vacuum pressure to the chamber 112. If the introduced vacuum in the chamber 112 is greater than the set pressure of the diaphragm actuator, which is provided by a set spring 124, it acts to deform the diaphragm 116, and the swing shutter 108 is moved with a connecting rod 126 to open. By this, the warmed air flowing through the warmed air induction passage 104 is introduced into the intake duct 106.

On the other hand, as shown in FIG. 9, the intake manifold 118 is provided with a water jacket 128 which constitutes a part of the engine coolant recirculation passage. By this the intake air flowing through the intake manifold 118 is warmed by the heat of the engine coolant flowing through the water jacket 128.

By warming up the intake air, the fuel atomization will be encouraged and good atomization characteristics can be obtained.

Likewise to the foregoing first embodiment, the fuel injection control unit 22 is connected to the crank angle sensor 26, the load sensor 28, a throttle angle position sensor 30 and the engine coolant temperature sensor 34. The fuel injection control unit 22 is adapted to control not only the fuel injection amount but also the fuel injection timing. The fuel injection control signal produced in the fuel injection control unit 22 is distributed to the electromagnetic actuator 24 of the fuel injection valve 10.

The fuel injection schedule in this embodiment is modified from the foregoing first embodiment. The operation of the fuel injection control unit in this second embodiment will be explained herebelow with reference to the timing chart of FIG. 10 which is illustrated in a manner similar to FIG. 5. In this embodiment, the valve overlapping at about the exhaust stroke top dead center is assumed to occur over about 22° of crank shaft rotation. Namely, the intake valve 16 and exhaust valve 17 overlap in opening over a crank angle from about 349° to 371° with respect to the compression stroke top dead center which is defined as the zero crank angle.

As is well known, the fuel injection signal fed from the fuel injection control unit 22 is a pulse train indicative of the duty cycle of the electromagnetic actuator 24. Therefore, as used herein the fuel injection timing is the timing of the rising of the first fuel injection pulse. According to this second embodiment, the fuel injection timing is set at slightly before the intake valve opening timing. This applies to some of the fuel injection pulses following the first one fed to the electromagnetic actuator after the intake valve opens, specifically, during the valve overlapping period.

Figure 10:
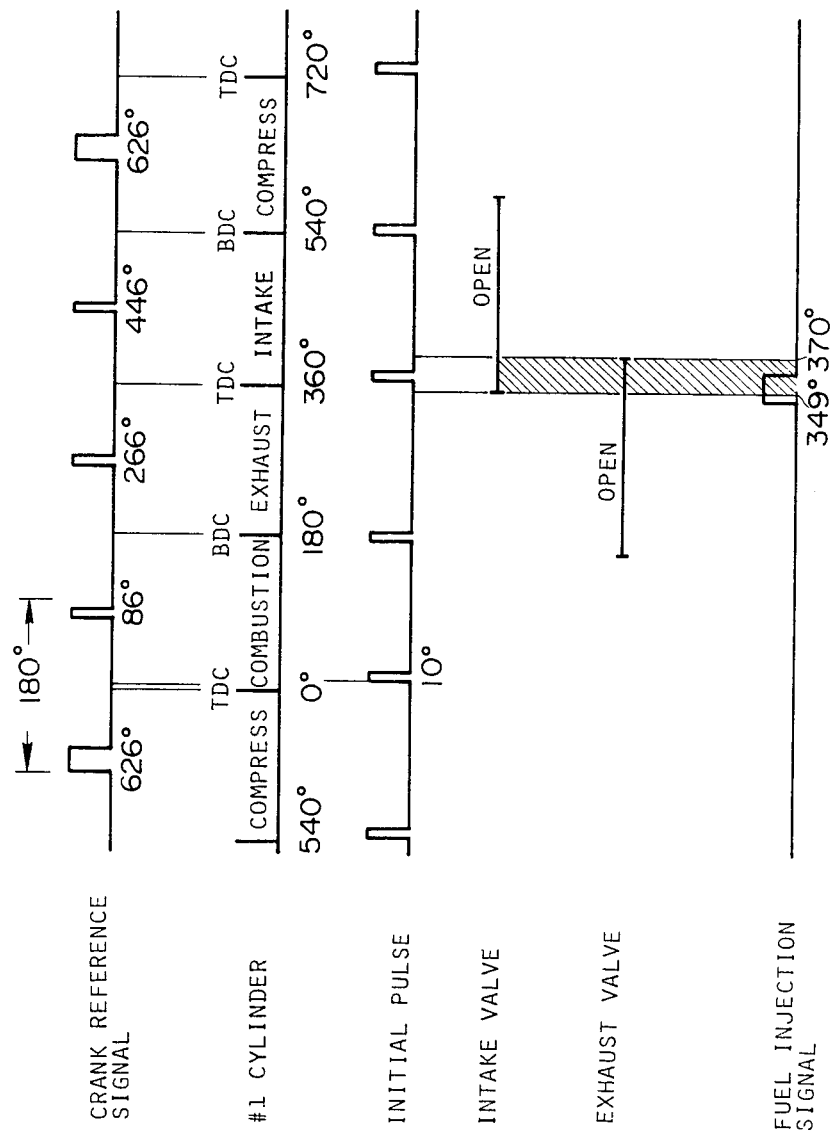
FIG. 10 is a timing chart similar to FIG. 5 and showing the operation of the fuel injection control unit in the fuel injection control system of FIG. 9.

It should be noted that the timing chart of FIG. 10 concerns the fuel injection timing control during engine idling. If the engine load is increased which is detected by the load sensor 28, beyond the engine idling condition, the fuel injection timing will be altered as set forth in the first embodiment.

By this, the fuel injected is effectively atomized by the substantially high heat of surge gas flowing back to the intake manifold as the intake valve starts opening and by increasing the flow velocity of the intake air during around the fuel injection valve in the valve overlapping period. Moreover, as the intake air is warmed to encourage atomization of the fuel injected, better atomization characteristics can be obtained according to the present invention. This result in a reduction of the fluctuation of engine torque or cycle-to-cycle fluctuation in engine idling conditions for improved engine stability. Further, by improving the fuel atomization characteristics, the required fuel amount can be reduced for fuel economy.

Figure 11:
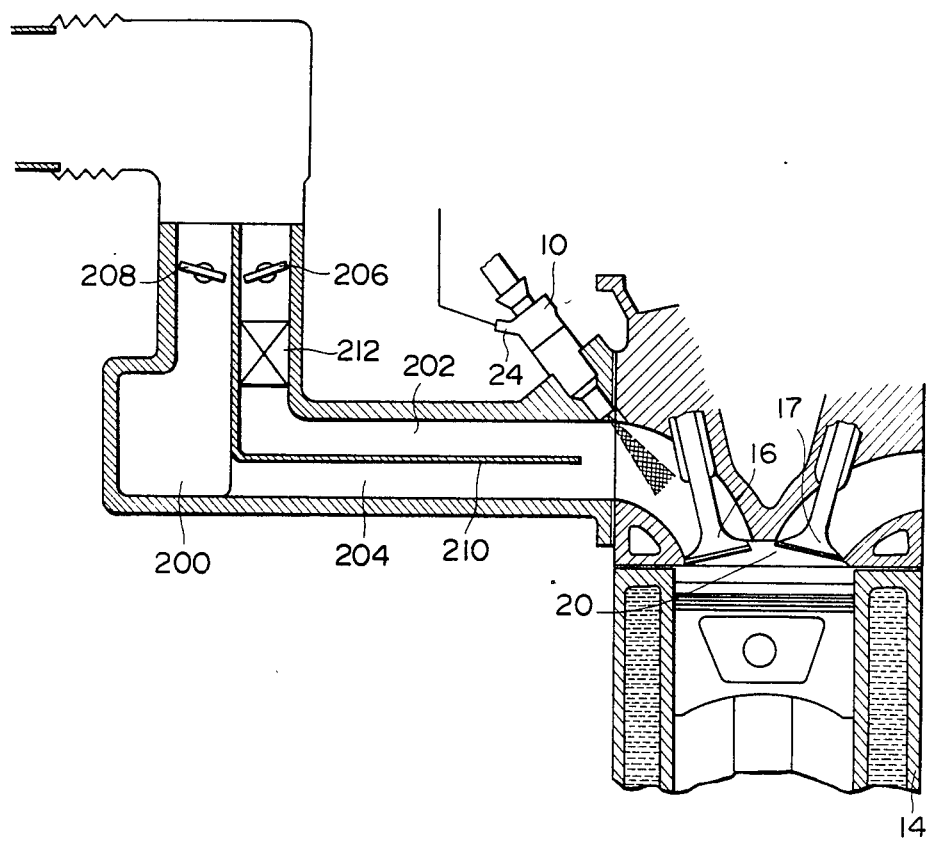
FIG. 11 is a fragmentary illustration of the third embodiment of the fuel injection control system of the present invention.

FIG. 11 shows a third embodiment of the fuel injection control system according to the present invention.

Similar to the foregoing second embodiment, the shown third embodiment has a modified intake passage 200 relative to the embodiment of FIG. 1. The intake passage 200 is separated into a primary passage 202 and a secondary passage 204 with a partition 210. Primary and secondary throttle valves 206 and 208 are provided in respective primary and secondary passages 202 and 204 for adjustment of the intake air flow rate. A heater unit 212 is inserted in the primary passage downstream of the primary throttle valve 206 to warm up the intake air, particularly during engine idling when, the secondary throttle valve 208 is fully closed. Therefore, the fuel atomization characteristics, particularly in engine idling condition, are improved.

While the invention has been illustrated in the specific embodiment of the invention by way of example, the invention should not be understood as limited to the hereabove given specific embodiment but should be understood as including any possible modifications for the whole or for in part thereof without departing from the principle of the invention.

What is claimed is:

1. A fuel injection control system for a multi-cylinder fuel injection internal combustion engine having an intake and exhaust port for each cylinder and a fuel injection valve disposed adjacent the intake port of each cylinder and directed towards the intake port, and an intake and exhaust valve for opening and closing the intake and exhaust ports respectively of each cylinder, and a crank shaft, said control system comprising:

first means for detecting engine load and for producing a first signal indicative of said engine load;

second means for detecting the angular position of said crank shaft and for producing a second signal each time the crank shaft passes a predetermined angular position;

third means for operating the intake and exhaust valves in synchronism with the crank shaft angular position, said intake and exhaust valves being operated with a predetermined valve overlap period during which both the intake and exhaust valves are open;

fourth means for determining a fuel injection amount based on said first signal and for producing a control signal for controlling the fuel injection valves of each cylinder to inject said fuel injection amount, said fourth means being further operable for determining a timing of said control signal based on said second signal to normally effect fuel injection at the injection valve of each cylinder during the valve overlap period of each cylinder said fourth means also being responsive to said first signal to advance the timing of said control signal to a time prior to said valve-overlap period when the engine load exceeds a predetermined threshold and, otherwise, to maintain the timing of said control signal within said valve overlap period.

2. The control system as set forth in claim 1, wherein said second signal has a unique signal value at said predetermined angular position of said crank shaft which corresponds to a predetermined position of a specific one of the cylinders to distinguish the specific cylinder from the remaining cylinders with respect to timing said control signal.

3. The control system as set forth in claim 1, wherein said engine has an air induction passage and further comprising means for preheating intake air flowing in said air induction passage.

4. The control system as set forth in claim 3, wherein said preheating means comprises an engine coolant passage formed in an intake manifold of said air induction passage for flowing heated engine coolant therethrough.

5. The control system as set forth in claim 3, wherein said preheating means comprises a heater unit in said air induction passage.

6. The control system as set forth in claim 5, wherein said air induction passage comprises a primary passage and secondary passage, said heater unit being in said primary passage, and further comprising primary and secondary throttle valves disposed in said primary and secondary passages respectively, said secondary throttle valve being closed during relatively low engine load conditions.

7. A fuel injection control system for a multi-cylinder fuel injection internal combustion engine having an intake and exhaust port for each cylinder and a fuel injection valve disposed adjacent the intake port of each cylinder and directed towards the intake port, and an intake and exhaust valve for opening and closing the intake and exhaust ports respectively of each cylinder, and a crank shaft, said control system comprising:
   first means for detecting engine load and for producing a first signal indicative of said engine load
   second means for detecting the angular position of said crank shaft and for producing a second signal each time the crank shaft passes a predetermined angular position;
   third means for operating the intake and exhaust valves in synchronism with the crank shaft angular position, said intake and exhaust valves being operated with a predetermined valve overlap period during which both the intake and exhaust valves are open;
   fourth means for determining a fuel injection amount based on said first signal and for producing a control signal for controlling the fuel injection valves of each cylinder to inject said fuel injection amount, said fourth means being further operable for determining a timing of said control signal based on said second signal to normally effect fuel injection at the injection valve of each cylinder during the valve overlap period of each cylinder;
   said fourth means being operable to change the timing of said control signal for each cylinder to time said control signal with the valve-overlap period of each cylinder said fourth means also being responsive to said first signal exceeding a predetermined threshold indicative of a high load condition to advance the timing of said control signal to a time prior to said valve overlap period and, otherwise, to maintain the timing of said control signal within said valve overlap period.

8. The control system as set forth in claim 7, wherein said second signal has a predetermined signal value for identifying a predetermined angular position of said crank shaft which corresponds to a predetermined position of a specific cylinder.

9. The control system as set forth in claim 7, wherein said fourth means advances the timing of said control signal to a crank shaft angular position corresponding to a combustion stroke of an engine cylinder when the engine load exceeds the predetermined threshold.

10. The control system as set forth in claim 7, wherein said fourth means advances the timing of the control signal to a crank shaft angular position corresponding to a compression stroke of an engine cylinder during engine warm-up.

11. A method for controlling fuel injection timing in a multi-cylinder fuel injection internal combustion engine having an intake port for each cylinder and a fuel injection valve for injecting fuel directly toward the intake port of each cylinder, and an intake and an exhaust valve for each cylinder, and a crank shaft, comprising the steps of:
   detecting crank shaft angular position;
   detecting, with reference to the crank shaft angular position, a valve-overlap period during which said intake and exhaust valves of a cylinder are both open;
   determining a fuel injection amount based on a preselected control parameter;
   producing, based on the determined fuel injection amount, a fuel injection valve control signal; and
   determining a timing of said control signal to effect fuel injection in each cylinder during the valve-overlap period of that cylinder.

12. The method as set forth in claim 11, wherein said control signal timing is different for each cylinder so that the control signal to the fuel injection valve of each cylinder corresponds to the valve-overlap period of that cylinder.

13. The method as set forth in claim 12, wherein said control signal timing is advanced when a load on the engine exceeds a predetermined load level.

14. The method as set forth in claim 13, wherein said control signal to the injector valve of each cylinder is timed to occur during the valve-overlap period whenever the engine is idling and the engine load does not exceed said predetermined load level.

15. The method as set forth in claim 13, wherein said control signal timing to the fuel injector of a cylinder is advanced to occur during a combustion stroke of the cylinder when the engine load exceeds said predetermined level.

16. The method as set forth in claim 13, wherein said control signal timing to the fuel injector of a cylinder is advanced to occur after the bottom dead center of a suction stroke of the cylinder when the engine load exceeds said predetermined level.

17. The method as set forth in claim 12, wherein the step of detecting crank shaft angular position further compress detecting a compression stroke top dead center position of a specific one of the cylinders for determining a correct control signal timing for each of the engine cylinders.

* * * * *